Nov. 27, 1956  E. I. VALYI  2,771,648
CURING SHELL MOLDS IN FLUIDIZED BEDS
Filed July 14, 1954
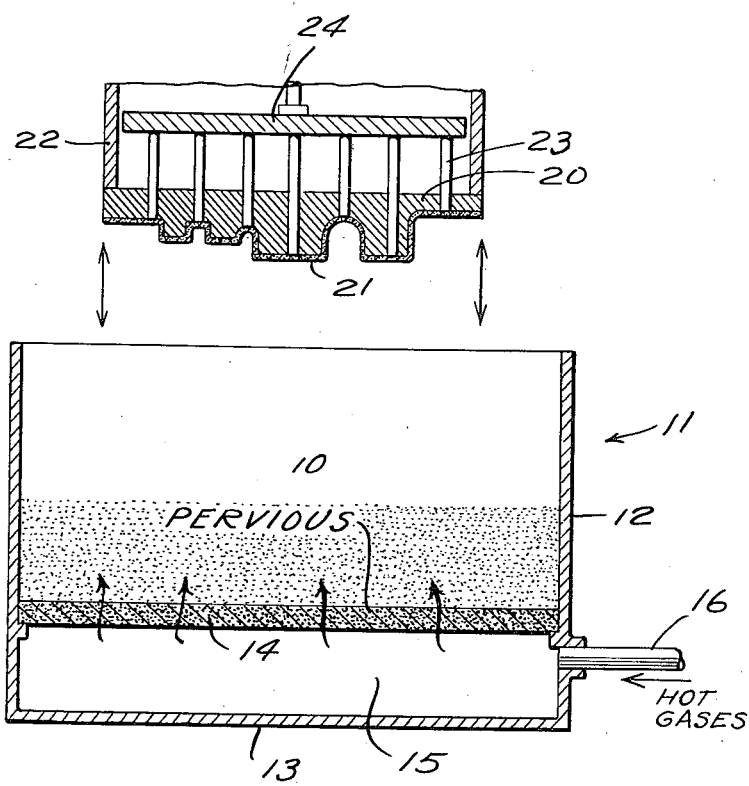
INVENTOR.
EMERY I. VALYI
BY
ATTORNEY United States Patent Office 2,771,648
Patented Nov. 27, 1956

2,771,648

CURING SHELL MOLDS IN FLUIDIZED BEDS

Emery I. Valyi, New York, N. Y.

Application July 14, 1954, Serial No. 443,407

1 Claim. (Cl. 22—193)

This invention relates to a method of heating solid bodies and more particularly to a method of curing shell-molds which are formed by contacting a mixture of a refractory and a binder with a heated pattern to build up a mold shell of predetermined thickness on the pattern, which is set but not cured by the heat derived from the pattern.

An object is to provide a rapid, simple and improved means for heating solid bodies of complex contour while avoiding any chemical or physical influence of the heating medium upon such bodies, other than the transfer of heat.

Another object is to provide a simplified, improved and efficient means for curing a mold shell.

In the process of shellmolding, bonding of the mold shell commences while the heated pattern is in contact with the molding mixture. In order to complete the bonding, however, it is necessary to subject the shell to a high temperature, such as in an oven or the like, for a limited time.

This standard curing procedure has the disadvantage of being relatively slow since the heat transfer is due solely to the oven atmosphere and to such radiant heat sources as may be placed within the oven.

On the other hand, curing the mold shell by dipping in a heated liquid such as a salt bath wets the shell and introduces chemical reactions which may be injurious to the shell.

In accordance with the present invention, a rapid heat transfer to the partly cured shell is obtained by bringing the shell into direct contact with a heated inert body which contacts all surfaces to be heated and physically supports the shell on the pattern. The heated body comprises a hot fluent refractory or metal bed which has the characteristics of a fluid and consists of finely divided particles of an inert material suspended in a gas such as heated air.

The partially cured shell, while still on the pattern, is dipped face down into the fluent bed and is maintained in contact therewith until curing of the shell is complete.

When the shell is dipped into the bed of fluent material, it displaces the same and causes the bed to yield and bring all parts of the shell into intimate contact with the hot particles.

The fluent particles exert an upward pressure upon all parts of the shell which supports the shell and prevents it from peeling away from the pattern. The particles in contact with the shell transfer heat thereto by conduction and radiation and the gas blowing through the bed contributes localized convection currents. Heat transfer between the particles themselves is efficient since they are separated by only an infinitesimal air space and are in constant motion which brings them into contact with each other. Heat is also transferred to the particles and to the shell by the hot gas.

It has been found that the heat transfer to the shell in the above step is so efficient that the curing time is reduced to not over one fourth of that required for the usual oven curing.

One form of apparatus which can be used for the curing step in accordance with the present invention is illustrated in the drawing in which the single figure is a diagrammatic sectional view thereof.

In carrying out the present curing step, a powdery or granular substance 10, such as sand, metal shot or metal powder or a refractory mix or powder which is inert to the material of the shell is placed in a container 11 having side walls 12, a bottom wall 13 and a dividing wall or membrane 14 of a pervious ceramic or other material which is air pervious and resistant to heat, such as filter stone, porous brick, or stainless mesh. The wall 14 supports the bed 10 of powdery or granular material and is spaced from the bottom wall 13 to provide an air chamber 15 to which air or other gas is supplied under pressure by a pipe 16. The air may be supplied at a pressure of from 1 lb. per sq. in. to 20 lbs. per sq. in., depending upon the type of material used and the thickness of the bed. The gas pressure used is such that the gas penetrates the membrane 14 into the material of the bed and causes the material to become fluent as described for example in Patent 2,527,488 to Schemm, dated October 24, 1950. The term "fluent" is used herein to refer to the condition of such a gas fluidized bed of solid particles which are capable of flowing like a liquid.

The fluent material may be heated from external sources as by heating the container walls or by heating the gas which is supplied thereto to cause it to become fluent. The material should be heated to a temperature of from 300° F. to 1200° F., depending upon the bonding material and the required curing time.

The pattern 20 carrying a partially cured mold shell 21 which may have been produced by suitable apparatus for contacting a heated pattern with a mold forming mixture such as that shown in copending application Serial No. 293,317, filed June 13, 1952, is supported on a bracket 22 which is mounted to be raised or lowered. The pattern 20 also carries stripper pins 23 actuated by a stripper plate 24 to strip the cured shell from the pattern.

The bracket 22 is lowered to dip the pattern 20 and shell 21 into the fluent bed 10 to an extent to bring the hot particles into intimate contact with all exposed surfaces of the shell 21 and is held in the position for a sufficient time to effect curing of the shell, after which the bracket 22 is raised to lift the shell 21 out of the bed of fluent material and the stripper plate 24 is actuated to strip the cured shell from the pattern 20.

By way of example only, a shell can be cured by this process in a matter of a half minute or less in contact with the hot fluent bed.

The time cycle for forming and curing the mold shell is reduced by the above-described dipping step since it is unnecessary to turn the pattern to upright position after the shell has been set and before curing as in the case of oven curing. Also, if the pattern itself is dipped into the hot fluent bed the pattern is preheated for the next shell-forming operation by the hot material at the same time that the previously formed shell is being cured. The term "mold shell" as used herein includes cores and other similar products.

Although a specific embodiment has been shown and described, it is to be understood that modifications may be made therein and that the invention may be applied to various uses as will be apparent to a person skilled in the art.

What is claimed is:

In a method of heat curing a mold shell, the steps of holding a partially cured mold shell, composed of a refractory material and a heat curable binder on a pattern in face downward relationship, moving said pattern with said partially cured mold shell thereon relatively to and into contact with a mass of particles of a substance inert to the material of said mold shell, passing a hot gas through said mass of particles to maintain said particles heated to curing temperature, and to cause said particles to move continuously, the presence of the gas being such as to cause the said continuously moving particles to hold said mold shell against said pattern during the heat curing of the mold shell, and the fluid condition of said particles causing said particles to come into contact with and to heat uniformly the entire surface of said mold shell, moving said mold shell relatively to and out of contact with said mass of particles after said mold shell is cured, and mechanically stripping said mold shell from said pattern.

References Cited in the file of this patent

UNITED STATES PATENTS

| | | |
|---|---|---|
| 2,610,842 | Schoenmakers et al. | Sept. 16, 1952 |
| 2,638,684 | Jukkola | May 19, 1953 |
| 2,670,573 | Sullivan | Mar. 2, 1954 |
| 2,712,165 | Dunn | July 5, 1955 |

OTHER REFERENCES

Fiat Final Report No. 1168 PB81284, May 30, 1947.